US008256203B1

(12) United States Patent
Blackmon et al.

(10) Patent No.: US 8,256,203 B1
(45) Date of Patent: Sep. 4, 2012

(54) ROCKET BASED COMBINED CYCLE PROPULSION UNIT HAVING EXTERNAL ROCKET THRUSTERS

(75) Inventors: James B. Blackmon, Brownsboro, AL (US); David B. Landrum, Madison, AL (US); Sean Entrekin, Huntsville, AL (US)

(73) Assignee: The University of Alabama in Huntsville, Huntsville, AL (US)

( * ) Notice: Subject to any disclaimer, the term of this patent is extended or adjusted under 35 U.S.C. 154(b) by 1178 days.

(21) Appl. No.: 12/021,142

(22) Filed: Jan. 28, 2008

Related U.S. Application Data

(60) Provisional application No. 60/886,689, filed on Jan. 26, 2007.

(51) Int. Cl.
*F02K 3/00* (2006.01)

(52) U.S. Cl. .............................. 60/224; 60/767

(58) Field of Classification Search ............... 60/224, 60/225, 767, 768, 207, 769, 246
See application file for complete search history.

(56) References Cited

U.S. PATENT DOCUMENTS

| | | | | |
|---|---|---|---|---|
| 2,673,445 A * | 3/1954 | Bruckmann | ................. | 60/225 |
| 2,713,243 A * | 7/1955 | Seaver | ..................... | 60/225 |
| 2,745,247 A * | 5/1956 | Singelmann et al. | ........... | 60/225 |
| 2,857,740 A * | 10/1958 | Hall et al. | ................. | 60/225 |
| 2,955,414 A * | 10/1960 | Hausmann | ................. | 60/244 |
| 2,960,824 A * | 11/1960 | Plummer | ................. | 60/789 |
| 3,038,408 A * | 6/1962 | Kluge | ..................... | 102/381 |
| 3,040,517 A * | 6/1962 | Ryden et al. | ................. | 60/225 |
| 3,049,876 A * | 8/1962 | Connors | ................. | 60/230 |
| 3,133,409 A * | 5/1964 | Fox | ..................... | 60/257 |
| 3,161,378 A * | 12/1964 | Creasey et al. | ............. | 244/53 B |
| 3,192,712 A * | 7/1965 | Nash et al. | ................. | 60/244 |
| 3,285,175 A * | 11/1966 | Keenan | ..................... | 60/225 |
| 3,286,469 A * | 11/1966 | Atherton | ................. | 60/224 |
| 3,901,028 A * | 8/1975 | Leingang | ................. | 60/225 |
| 4,500,052 A * | 2/1985 | Kim | ................. | 244/12.1 |
| 4,667,900 A * | 5/1987 | Kim | ................. | 244/53 B |
| 5,159,809 A * | 11/1992 | Ciais et al. | ................. | 60/225 |
| 5,327,721 A * | 7/1994 | Bulman | ..................... | 60/269 |
| 5,337,975 A | 8/1994 | Peinemann | | |
| 6,293,091 B1 * | 9/2001 | Seymour et al. | ............... | 60/225 |

(Continued)

OTHER PUBLICATIONS

Luca Boccaletto, "Solving the flow separation issue: a new nozzle concept," 44th AIAA/ASME/SAE/ASEE Joint Propulsion Conference & Exhibit, Hartford, CT, 2008.

*Primary Examiner* — William H Rodriguez
(74) *Attorney, Agent, or Firm* — Maynard Cooper & Gale, PC; Jon E. Holland

(57) ABSTRACT

The present disclosure generally pertains to rocket based combined cycle (RBCC) propulsion units. In one exemplary embodiment, at least one rocket thruster is integrated with a jet engine but is external to the flow path of the jet engine, forming an altitude compensating plug nozzle. Since the rocket thruster is external to such flow path, the rocket flow from the rocket thruster interacts with the jet flow from the jet engine aft of the nozzle of the jet engine. Such interaction occurs without a significant performance penalty in the operation of the jet engine. In fact, it is possible that the interaction of the rocket flow with the jet flow may actually improve the efficiency of the jet engine under some conditions. Moreover, having the rocket thrusters positioned external to the flow path of the jet engine helps to avoid many of the problems plaguing conventional RBCC propulsion units.

18 Claims, 5 Drawing Sheets

U.S. PATENT DOCUMENTS

| | | | |
|---|---|---|---|
| 6,981,364 B2 * | 1/2006 | Okamoto et al. | 60/224 |
| 7,762,077 B2 * | 7/2010 | Pederson et al. | 60/767 |
| 2005/0284129 A1 * | 12/2005 | Wood | 60/224 |
| 2007/0187550 A1 | 8/2007 | Elvin | |
| 2008/0128547 A1 * | 6/2008 | Pederson et al. | 244/55 |
| 2008/0283677 A1 * | 11/2008 | Pederson et al. | 244/73 R |
| 2009/0071120 A1 | 3/2009 | Bulman | |

\* cited by examiner

ROCKET BASED COMBINED CYCLE PROPULSION UNIT HAVING EXTERNAL ROCKET THRUSTERS

CROSS REFERENCE TO RELATED APPLICATION

This application claims priority to U.S. Provisional Patent Application No. 60/886,689, entitled "Integrated RAM/SCRAM.Turbo Jet Aerospike Rocket Engine," and filed on Jan. 26, 2007, which is incorporated herein by reference.

RELATED ART

Combined Cycle Propulsion (CCP) technology shows promise for next generation launch vehicles, missiles, and aircraft. A combined cycle system incorporates several modes of engine operation into the same flow path. For example, a launch vehicle powered by a typical Rocket Based Combined Cycle (RBCC) propulsion unit may operate in an air-augmented rocket mode for takeoff and initial acceleration to around Mach 1.5, transition to ramjet operation until around Mach 4-6, and then transition to scramjet operation. Above around Mach 8-10, scramjet operation is presently unrealistic, and the engine may operate as a pure rocket to accelerate into orbit or for a high speed dash, as for example, with supersonic cruise missiles. The basic principle is to operate the engine in the propulsion mode that provides the highest specific impulse (Isp) for that flight condition.

In one conventional air-augmented rocket mode, a rocket thruster is integrated with and internally mounted in a jet engine in order to augment the thrust provided by the jet engine at lower speeds. The rocket thruster accelerates a vehicle to a velocity at which atmospheric air enters the engine with sufficient flow rate and pressure to mix and combust with the fuel rich rocket exhaust. These gas products are then exhausted through the remainder of the engine duct and a nozzle to produce thrust. Although the amount of onboard oxidizer and thus vehicle volume is reduced, the mixing of the ingested air and fuel rich rocket exhaust can be an inefficient process that reduces overall performance. Additional downstream fuel injection may be implemented to supplement the rocket exhaust products. These internal rocket nozzles, injectors, and flame holders are sources of drag.

At a flight Mach number around 1.5 or higher, the internal rocket thruster is turned off and the engine transitions to a pure ramjet mode. The incoming air is compressed to subsonic Mach numbers by shock waves in the engine inlet. Downstream RAM injectors supply fuel that mixes with the air and is then ignited and sustains combustion at the flame holders. A range of injection points and a series of duct geometries may be desired as Mach number increases. Around Mach 4 or higher, the engine transitions to scramjet mode. Scramjet operation is generally similar to a ramjet, except the inlet geometry is adjusted to reduce spillage of the incoming air, which remains supersonic through the engine. Another set of injectors and flame holders are also used to provide adequate mixing and combustion.

Along a typical flight trajectory, the increase in velocity corresponds to an increase in altitude, such that around Mach 8-10 there is often insufficient air for scramjet operation. In such case, the external inlet can be closed and the internal rocket is operated to orbital altitude. In some combined cycle engine configurations, the scramjet mode is not included, and the ramjet mode transitions directly to the pure rocket.

In alternate combined cycle engine configurations, external rocket engines replace the air-augmented internal rocket thruster. These rocket engines are attached to the vehicle and are not integrated with the jet engine. One problem with mounting a rocket engine external to the jet engine is that the rocket engine typically increases the vehicle cross-sectional area and thus the aerodynamic drag, especially in the transonic flight regime. More rocket engines may be desired to offset the increased drag, but adding rocket engines usually increases the cross-sectional area further. Additionally, traditional rocket nozzles (often referred to as bell nozzles) do not usually operate efficiently over a wide altitude (and hence external pressure) range. Nozzles designed for the high altitude, pure rocket mode generally do not perform well at low altitudes. Bell nozzles that have the ability to compensate for altitude change are usually very complex, employing moving nozzle exhaust skirts. These additional features increase cost and weight, further complicate the packaging, and can lead to reduced reliability and life.

Incorporating the various engine modes into one flow path creates a number of operational and packaging issues. As the engine transitions between modes, it may be desirable to adapt the inlet geometry in order to accommodate both a change in flow path height and enhance shock capture at various Mach numbers. It also may be desirable to change the internal geometry. For combined cycle engines with an integrated rocket thruster, this geometry change may be even more complex for the ram/scramjet modes. The geometric changes could require heavy screw drives with an associated weight penalty. Different sets of fuel injection and flame holding devices may be required along the mixing duct for ramjet and scramjet operation, and may also be required for the initial air-augmented rocket operation. However, the engine mode transitions should be relatively smooth and avoid sharp changes in thrust. Finally, the number of engines and the optimum positioning of the engine components and propellant tanks complicates the design process even further.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to rocket based combined cycle (RBCC) propulsion units. In one exemplary embodiment, at least one rocket thruster is integrated with a jet engine but is external to the flow path of the jet engine, forming an altitude compensating plug nozzle. Since the rocket thruster is external to such flow path, the rocket flow from the rocket thruster interacts with the jet flow from the jet engine aft of the nozzle of the jet engine. Such interaction occurs without a significant performance penalty in the operation of the jet engine. In fact, it is possible that the interaction of the rocket flow with the jet flow may actually improve the efficiency of the jet engine under some conditions. Moreover, having the rocket thrusters positioned external to the flow path of the jet engine helps to avoid many of the problems plaguing conventional RBCC propulsion units.

In one exemplary embodiment, a converging/diverging nozzle is used for a jet engine. Such nozzle, which converges and diverges for the flow path of the jet engine, forms a plug nozzle for the rocket thrusters that are external to such flow path. The thrust provided by the rocket thrusters augments the thrust of the jet engine and the plug nozzle rocket exhaust has intrinsic altitude compensation and can further compensate for altitude-related performance issues, such as over-expansion or under-expansion of the jet engine. Such an embodiment allows the air-breathing engine (e.g., ramjet, scramjet, turbo-ramjet) to be optimized and operate separately from the rocket thrusters. The rocket and air-breathing engine exhaust flows only interact at the plug base. This approach avoids the complexity of changing the geometry and locations of fuel injectors and burners within the jet engine.

In one exemplary embodiment, the rocket thrusters are integrated into the nozzle region of a jet engine so as to reduce form drag and improve the rocket and ramjet flows, with less loss due to slip and shock interaction. This improvement can be achieved by taking advantage of the shape of the ramjet/scramjet exhaust nozzle configuration to "nest" the rocket thrusters so that they are not a significant source of drag. Performance can be improved by matching, to the extent feasible, the rocket and jet engine exhaust flow static pressures, while minimizing the angular changes in the flow field that produce irreversible shock interaction losses. In at least one embodiment, a RBCC engine provides efficient packaging, increased performance, weight reduction, low drag, and smooth engine operating mode transitions relative to many traditional RBCC configurations.

Figure 1:
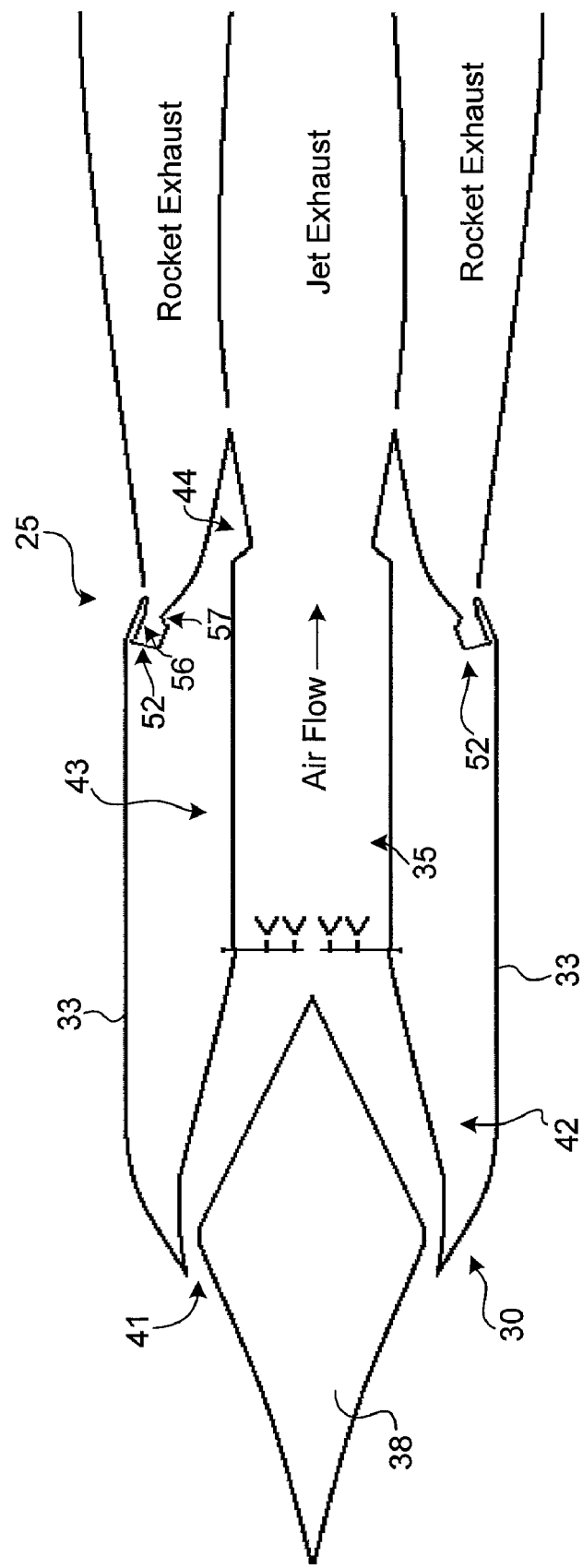
FIG. 1 illustrates an exemplary embodiment of a rocket based combined cycle (RBCC) propulsion unit.

FIG. 1 depicts an exemplary embodiment of a RBCC propulsion unit 25. The unit 25 comprises a jet engine 30, which can be similar to any conventional jet engine. The jet engine 30 shown by FIG. 1 is a conventional ramjet engine. In other embodiments, other types of known or future-developed air-breathing jet engines, such as scramjet, turbojet, pulsejet, etc., are possible. In addition, in other embodiments, the jet engine 30 is implemented via a rocket engine instead of an air-breathing engine.

The exemplary jet engine 30 shown by FIG. 1 has an engine wall 33 that forms a flow path 35 through which air flows. The engine wall 33, as well as the flow path 35 defined by the wall 33, can have various shapes depending on the type of engine 30 being employed. The engine 30 also has an inlet spike 38, which can typically be adjusted to accommodate various flight conditions. The engine 30 can be attached to various objects, such as airplanes or missiles, in order to provide thrust to such objects.

The jet engine 30 can have various sections depending on the engine type being employed. In one exemplary embodiment, the engine 30 includes an air intake 41, an inlet throat 42, a combustion chamber 43, and a nozzle 44. Air enters the jet engine 30 at the air intake 41 and flows through the throat 42 into the combustion chamber 43. Downstream of the inlet throat 42, fuel injectors inject fuel into air flowing through the path 35, and the fuel is ignited and burns at the flame holders in the combustion chamber 43. The tail of the engine 30 forms a nozzle 44. In this regard, the cross-sectional area of the flow path 35 begins to decrease after the combustion chamber 43 so that the exhaust from the combustion chamber 43 is accelerated through the engine tail or nozzle 44. Toward the end of the nozzle 44, the cross-sectional area of the flow path 35 increases to allow the exhaust to expand as it exits the nozzle 44. Thus, the nozzle 44 is a converging/diverging nozzle. Various types of known or future-developed jet engines, including air-breathing as well as rocket engines, could be used to implement the engine 30.

Figure 3:
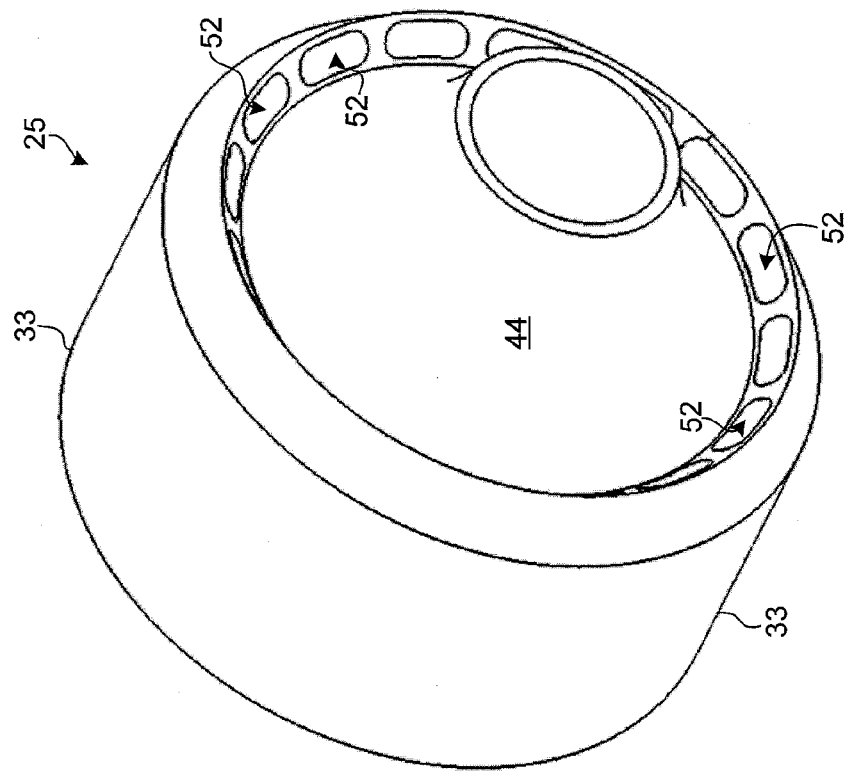
FIG. 3 illustrates a three-dimensional view of the tail depicted in FIG. 2.
Figure 2:
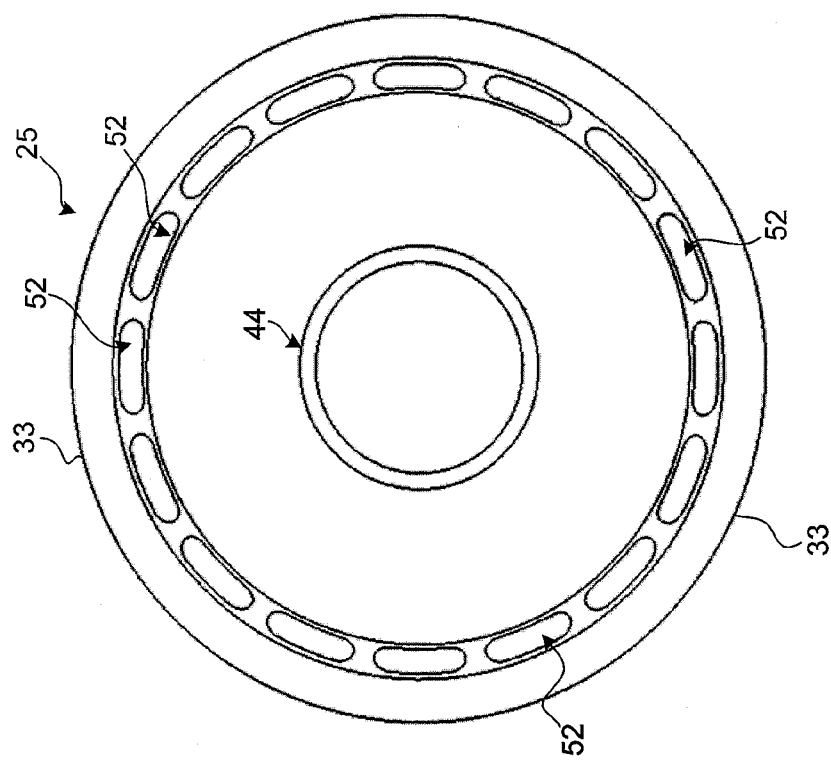
FIG. 2 illustrates a tail of the RBCC propulsion unit depicted by FIG. 1.

As shown by FIG. 1, at least one rocket thruster 52 is positioned on an exterior of the engine wall 33 external to the flow path 35. In the embodiment shown by FIGS. 1-3, each rocket thruster 52 is integral with the engine wall 33. In this regard, for each rocket thruster 52, the engine wall 33 forms the flow path through which exhaust from the rocket thruster 52 exits. Further, the nozzle 44 serves as a ramp for the exhaust of the rocket thrusters 52. In the exemplary embodiment shown by FIG. 1, the exterior contour of the nozzle 44 implements a plug nozzle for the exhaust flow from the rocket thrusters 52. Thus, the nozzle 44 implements a converging/diverging nozzle for the flow path 35 of the jet engine 30 and a plug nozzle for the exhaust flow from the rocket thrusters 52.

Ideally, the exhaust flow of the rocket thrusters 52 are substantially matched with the exhaust flow of the jet engine 30. In particular, the exhaust velocity for each rocket thruster 52 is controlled such that the static pressure of the exhaust flow of each rocket thruster 52 is approximately equal to the static pressure of the exhaust flow of the jet engine 30. However, matching of the exhaust flows of the rocket thrusters 52 and the jet engine 30 to equalize static pressures is unnecessary in all embodiments.

As shown by FIG. 1, each rocket thruster 52, similar to the jet engine 30, has a combustion chamber 56 into which fuel is injected and burned. Each thruster 52 also has a converging/diverging nozzle 57 through which exhaust exits. In this regard, the cross-sectional area of the flow path defining the combustion chamber 56 decreases at the nozzle 57 thereby accelerating the rocket exhaust. The cross-sectional area of the flow path then begins increasing allowing the rocket exhaust to expand and increase in velocity before exiting the thruster 52.

The rocket thrusters 52 and the jet engine 30 can be selectively activated in order to achieve desired performance goals. For example, in one embodiment, the propulsion unit 25 is attached to an aircraft, and the rocket thrusters 52 are activated during taxiing and/or take-off. Once the aircraft achieves a certain altitude and/or speed, the jet engine 30 is activated and begins to provide thrust. At this point the rocket thrusters 52 can be deactivated or remain activated in order to augment the thrust provided by the jet engine 30. Indeed, while the jet engine 30 is activated, the rocket thrusters 52 can be selectively activated and deactivated depending on desired performance goals.

For example, if speed is critical, the jet engine 30 and the rocket thrusters 52 can be simultaneously activated, such as for short dash speeds, evasive maneuvers, high speed closing distances to increase kinetic energy at impact, etc. If efficiency is a paramount concern, then the rocket thrusters 52 may be selectively activated based on various factors, such as altitude and/or airspeed. In this regard, there are altitudes at which the jet engine 30 may be designed to operate more efficiently than other altitudes. For example, over-expansion and under-expansion are well known altitude-based problems suffered by many jet engines. While the aircraft is at altitudes for which the jet engine 30 operates efficiently, the rocket thrusters 52 may be deactivated. However, at altitudes for which the jet engine 30 operates inefficiently (e.g., when the jet engine 30 is operating at altitudes causing over-expansion or under-expansion), the rocket thrusters 52 may be activated. At altitudes for which the rocket thrusters 52 are activated, the jet engine 30 may continue to operate or may be deactivated, as may be desired. Moreover, the overall efficiency of the propulsion unit 25 may be enhanced via selective activation of the jet engine 30 and/or rocket thrusters 52.

Further, it is believed that the interaction of the exhaust flow from the rocket thrusters 52 and the exhaust flow from the jet engine 30 can compensate for effects of over-expansion and possibly under-expansion of the jet engine 30 such that the thrust provided by the jet engine 30 is greater than the thrust that would have been provided in the absence of the exhaust flow from the rocket thrusters 52. In this regard, it is believed that the exhaust flow from the rocket thrusters 52 forms a boundary that helps limit the expansion of the exhaust flow from the jet engine 30 thereby improving the performance of the jet engine 30, particularly when the exhaust flows of the rocket thrusters 52 and the jet engine 30 are matched.

Figure 4:
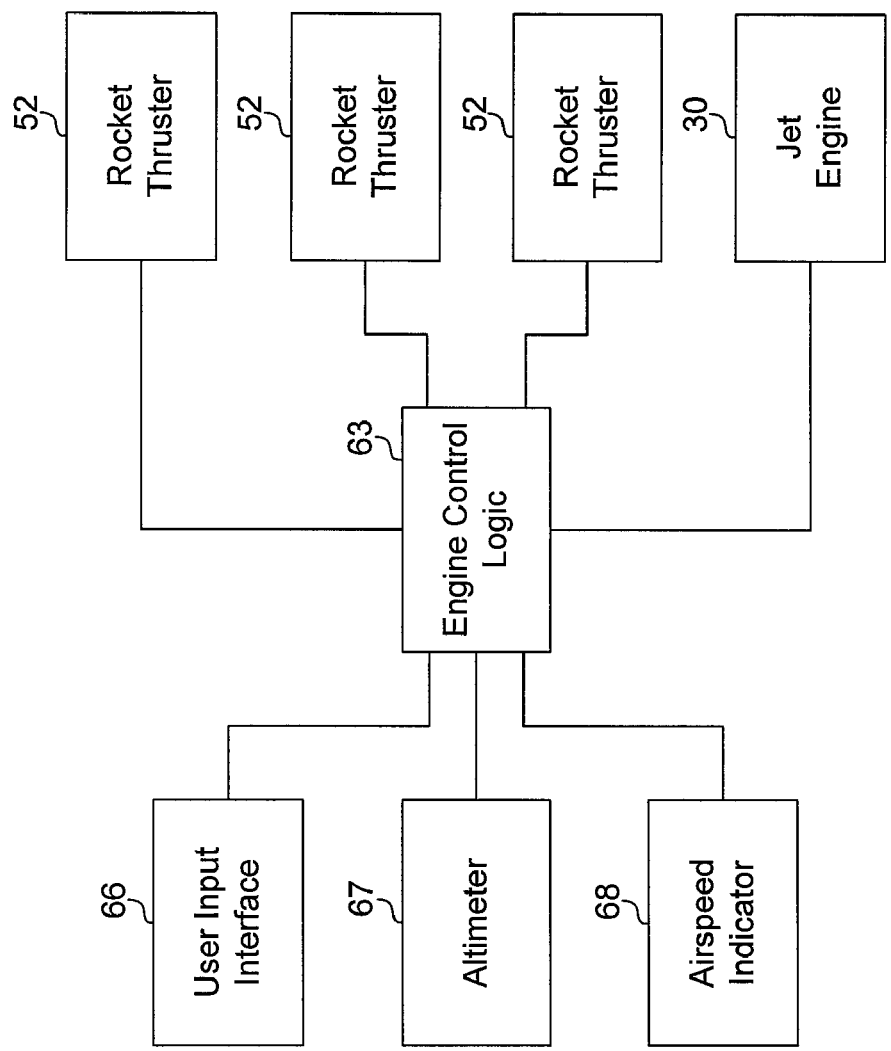
FIG. 4 is a block diagram illustrating an exemplary embodiment of a RBCC propulsion unit.

FIG. 4 depicts a block diagram of an exemplary embodiment of a propulsion unit 25. As shown by FIG. 4, the jet engine 30 and the rocket thrusters 52 are communicatively coupled to engine control logic 63, which controls the activation states of the rocket thrusters 52 and the jet engine 30 based on various input, such as input from a user input interface 66, an altimeter 67, and/or an airspeed indicator 68. Other types of input devices are possible in other embodiments. The user input interface 66 comprises any known or future-developed device or devices, such as a button, switch, keypad, lever, and/or other device, that allow a user to provide input. For simplicity, FIG. 4 depicts three rocket thrusters 52 and one jet engine 30, but other numbers of rocket thrusters 52 and/or jet engines 30 are possible.

Figure 5:
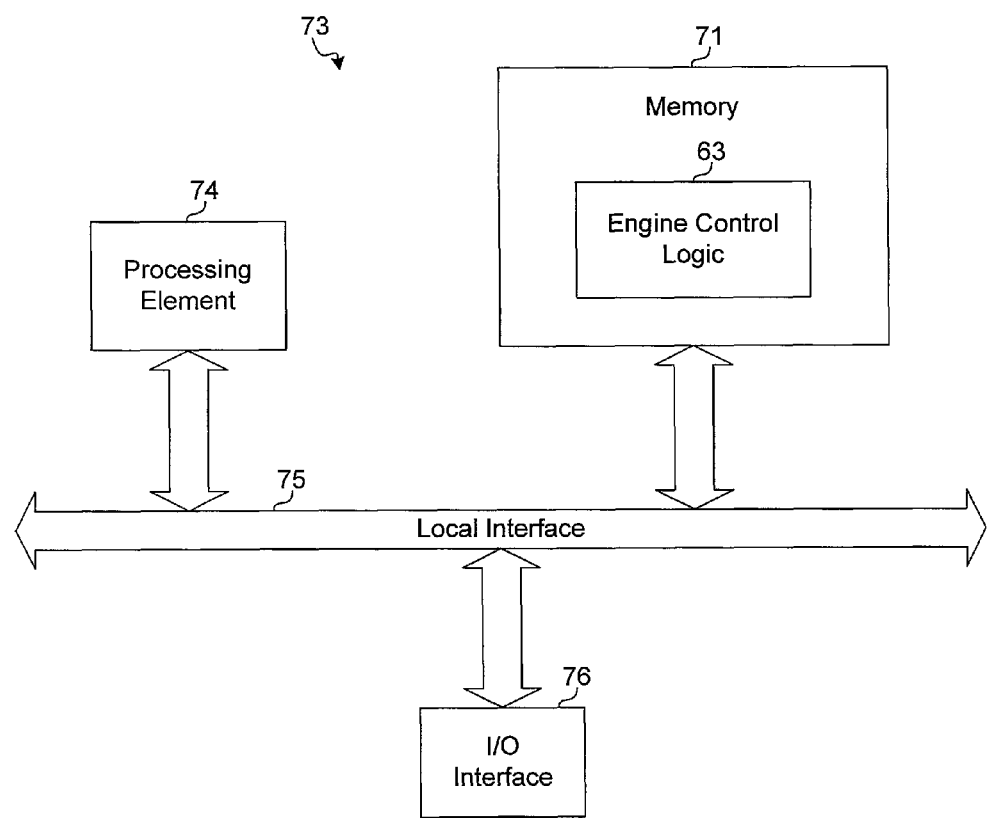
FIG. 5 is a block diagram illustrating an exemplary embodiment of a computer system employed by a RBCC propulsion unit, such as is depicted by FIG. 4.

The engine control logic 63 can be implemented in software, hardware, or a combination thereof. In an exemplary embodiment illustrated in FIG. 5, the engine control logic 63, along with its associated methodology, is implemented in software and stored in memory 93 of a computer system 73. The system 73 comprises a processing element 74, such as a central processing unit (CPU), which executes instructions of the engine control logic 63, when such logic 63 is implemented in software. The processing element 74 communicates to and drives the other elements within the system 73 via a local interface 75, which can include at least one bus. In addition, an input/output (I/O) interface 76 allows the logic 63 to exchange data with other components, such as the user input interface 66, the altimeter 67, the airspeed indicator 68, the jet engine 30, and the rocket thrusters 52.

Note that the engine control logic 63, when implemented in software, can be stored and transported on any computer-readable medium for use by or in connection with an instruction execution apparatus that can fetch and execute instructions. In the context of this document, a "computer-readable medium" can be any means that can store a program for use by or in connection with an instruction execution apparatus.

The engine control logic 63 can be configured to selectively control the activation states of the rocket thrusters 52 and the jet engine 30 in accordance with any desired algorithm. In this regard, the engine control logic 63 controls whether each thruster 52 and the jet engine 30 are activated and the extent to which the thrusters 52 and jet engine 30 are activated (i.e., the amount of thrust provided). An exemplary methodology for controlling the propulsion unit 25 will be described below. It should be emphasized that other methodologies for controlling the unit 25 are possible.

For purposes of illustration, assume that jet engine 30 is a ramjet, as shown by FIG. 1, and is used to provide thrust to an aircraft. Initially, during taxiing and take-off, the engine control logic 63 activates the rocket thrusters 52 and deactivates the jet engine 30. Thus, all of the thrust provided by the propulsion unit 25 is via rocket thrusters 52. The engine control logic 63 receives, via the user input interface 66, control input from a pilot or other user and, based on such input, controls the amount of thrust provided by the rocket thrusters 52. At an airspeed for which operation of the jet engine 30 is feasible and efficient, such as around Mach 1.5, for example, the engine control logic 63 activates the jet engine 30. In this regard, the engine control logic 63 gradually throttles down the rocket thrusters 52 (i.e., decreases the thrust provided by the thrusters 52) while gradually throttling up the jet engine (i.e., increasing the thrust provided by the engine 30), until all of the thrust provided by the propulsion unit 25 is from the jet engine 30. Note that the transition can be automatically triggered based on input from the airspeed indicator 68 or other device, or the transition can be manually triggered via input received by the user input interface 66. Other techniques for triggering and/or controlling the transition are also possible.

At a higher airspeed, such as, for example, around Mach 5, for which operation of the jet engine 30 is not feasible and/or inefficient, the engine control logic 63 activates the rocket thrusters 52. In this regard, the engine control logic 63 gradually throttles down the jet engine 30 (i.e., decreases the thrust provided by the engine 30) while gradually throttling up the rocket thrusters 52 (i.e., increasing the thrust provided by the thrusters 52), until all of the thrust provided by the propulsion unit 25 is from the rocket thrusters 52. Note that the transition can be automatically triggered based on input from the airspeed indicator 68 or other device, or the transition can be manually triggered via input received by the user input interface 66. Other techniques for triggering and/or controlling the transition are also possible.

As the aircraft is slowing, the transition process described above can be performed in reverse. That is, the engine control logic 63 transitions from rocket mode to ramjet mode when the speed of the aircraft falls below a certain airspeed, such as around Mach 5, and the engine control logic 63 transitions from ramjet mode to rocket mode when the speed of the aircraft falls below a certain airspeed, such as around Mach 1.5.

Note that the operation of the propulsion unit 25 may also be controlled based on factors other than or in addition to airspeed. For example, the engine control logic 63 may control the activation states of the rocket thrusters 52 and jet engine 30 based on altitude. For example, at extremely high altitudes, such as over 70,000-80,000 feet, the density of the atmosphere is so low that operation of the jet engine 30 may not be feasible or may be inefficient. At some altitude, such as around 80,000 feet, the engine control logic 63 transitions from ramjet mode to rocket mode regardless of the airspeed. Such transition may be automatically triggered based on input from the altimeter 67 or other device, or the transition may be manually triggered based on input from the user input interface 66.

In addition, the engine control logic 63 is be configured to operate simultaneously in the rocket mode and ramjet mode. For example, in one embodiment, the pilot provides input via the user input interface 66 to control the amount of thrust provided by the jet engine 30 and the rocket thrusters 52. In another exemplary embodiment, the engine control logic 63 intelligently controls the activation states based on inputs from the user input interface 66, the altimeter 67, and the airspeed indicator 68. In this regard, the engine control logic 63 receives input from the user input interface 66 indicative of an amount of thrust that is desired. The engine control logic 63, based on inputs from the altimeter 67 and the airspeed indicator 68, then automatically determines how the rocket thrusters 52 and the jet engine 30 are to be controlled in order to efficiently deliver the desired thrust and desired flight profile.

In this regard, the engine control logic 63 stores predefined data, referred to as "performance data" indicating how the propulsion is to be controlled based on various sets of input from the user input interface 66, altimeter 67, and airspeed indicator 68. Such performance data may be defined based on previous test results of the propulsion unit 25 or similar propulsion units in order to optimize the efficiency or performance of the unit 25. Using the inputs from the user input interface 66, altimeter 67, and airspeed indicator as keys, the engine control logic 63 looks up control information that is correlated with such keys. The control information indicates how the thrusters 52 and the jet engine 30 are to be controlled for the flight conditions (e.g., altitude and airspeed) in order to provide the desired thrust, and the engine control logic 63 controls the propulsion unit 25 in accordance with such control information.

As an example, the aircraft may be at an airspeed for which ramjet operation is normally efficient in the absence of under-expansion or over-expansion. However, the aircraft may be at an altitude that results in over-expansion or under-expansion thereby decreasing the efficiency of the jet engine 30. In such a situation, it may be desirable to supplement the thrust of the jet engine 30 with thrust from the rocket thrusters 52. Based on the inputs and the performance data, the engine control logic 63 automatically determines the amount of thrust that is to be provided by the thrusters 52 and the jet engine 30 and controls the thrusters 52 and the jet engine 30 accordingly. Thus, the desired thrust is provided by a combination of the jet engine 30 and the rocket thrusters 52. Note that the rocket thrusters 52 may have a higher efficiency than the jet engine 30 at the given altitude and airspeed such that the overall efficiency of the propulsion unit 25 is increased via activation of the rocket thrusters 52. In addition, as described above, the rocket thrusters 52 may help to compensate for the effects of over-expansion and/or under-expansion thereby increasing the efficiency of the jet engine 30 under certain operating conditions.

Figure 7:
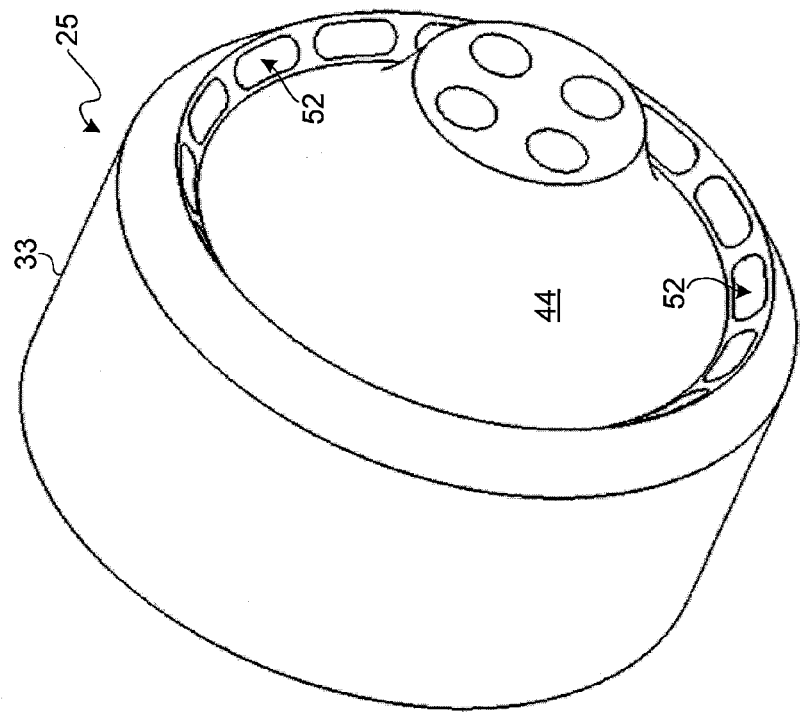
FIG. 7 illustrates a three-dimensional view of the tail depicted in FIG. 6.
Figure 6:
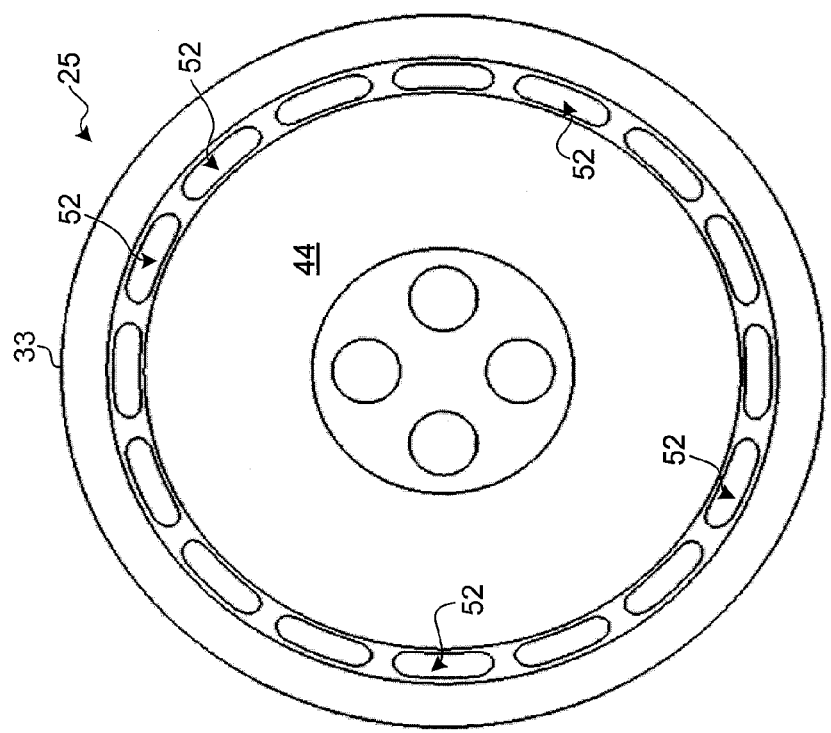
FIG. 6 illustrates a tail of an exemplary embodiment of a RBCC propulsion unit.

It should be noted that various modifications can be made to the embodiments described above without departing from the principles of the present disclosure. For example, it is possible for the propulsion unit 25 to have more than one jet engine. FIGS. 6 and 7 show an exemplary tail of a propulsion unit 25 having multiple exhaust ports 88. Each port is for a respective jet engine. Thus, in the example shown, four jet engines may be accommodated. Preferably, such jet engines are integrated with one another, but it is possible for the jet engines to be non-integrated.

In one exemplary embodiment, the engine control logic 63 is configured to selectively control activation of the rocket thrusters 52 to provide directional control for steering. For example, the thrusters 52 on one side of the propulsion unit 25 may be activated, and the thrusters 52 on the opposite side may be deactivated in order to turn the propulsion unit 25 and any object (e.g., aircraft) attached to it. Further, the thrusters 52 on the bottom of the propulsion unit 25 may be activated and the thrusters 52 on top of the unit 25 may be deactivated in order to increase the pitch of the unit 25 and any object (e.g., aircraft) attached to it. Also, the thrusters 52 on the top of the propulsion unit 25 may be activated and the thrusters 52 on the bottom of the unit 25 may be deactivated in order to decrease the pitch of the unit 25 and any object (e.g., airplane) attached to it. Rather than deactivating some of the thrusters 52, it is possible for similar steering effects to be achieved by controlling the thrusters 52 such that some of the thrusters 52 provide greater thrust than other of the thrusters 52.

As is apparent by the foregoing description, there are many different embodiments for RBCC propulsion units, which have various advantages and features depending on the embodiment employed. For example, by placing the rocket thrusters 52 external to the flow path of the jet engine 30, operation of the thrusters 52 and the jet engine 30 can be optimized separately. In addition, in some embodiments, the propulsion unit 25 can more smoothly transition between engine modes relative to some conventional RBCC configurations. Overall performance and/or efficiency can be increased, and existing jet engines can be retrofitted with rocket thrusters. Unlike conventional "ramrockets," which have combined flow paths, the losses associated with internal fluid dynamic interactions between the rocket exhaust and air-breathing combustion zone exhausts can be avoided. The overall performance can be improved as a function of altitude by having the compensating plume expansion with changes in external pressure provided by a plug nozzle.

In addition, the wake region drag associated with a typical aerospike can be substantially reduced by using low-level air-breathing core flow for base bleed in the rocket mode and then using the full core flow plume in the air breathing engine mode. Overall vehicle form drag can be greatly reduced when the rocket thrusters are not internal to the jet engine. In addition, the rocket thrusters can be nested in the engine wall so that no additional cross-sectional area resulting from the presence of the rocket thrusters is exposed to air flow thereby reducing drag. A conventional ram/scramjet duct does not have to be enlarged to accommodate the rocket thrusters. Also, the rocket thrusters can be positioned on the throat region of an air-breathing engine. These packaging features help to reduce the overall vehicle cross-sectional area and thus the transonic drag.

Furthermore, the overall average specific impulse (Isp) over traditional RBCC systems can be increased. In addition, differentially throttling of the thrusters around a plug nozzle can be used instead of gimbaling for thrust vector control, thereby saving weight and reducing complexity. Various other features and advantages for embodiments of the present would be apparent to one of ordinary skill in the art upon reading this disclosure.

The invention claimed is:

1. A rocket based combined cycle (RBCC) propulsion unit, comprising:
 a jet engine having a flow path and a nozzle, wherein jet exhaust from the flow path exits the RBCC propulsion unit from the nozzle; and
 a rocket thruster integrated with the jet engine and positioned external to the flow path such that rocket exhaust from the rocket thruster travels along an exterior wall of the jet engine and begins to interact with the jet exhaust aft of the nozzle and external to the RBCC propulsion unit, wherein an interior wall of the nozzle converges and diverges for the flow path, and wherein a contour of the exterior wall forms a plug nozzle for the rocket thruster.

2. The RBCC propulsion unit of claim 1, wherein the jet engine is air-breathing.

3. The RBCC propulsion unit of claim 1, wherein the rocket exhaust is substantially matched with the jet exhaust.

4. A rocket based combined cycle (RBCC) propulsion unit, comprising:
- a jet engine having a flow path and a nozzle, wherein jet exhaust from the flow path exits the RBCC propulsion unit from the nozzle;
- a rocket thruster integrated with the jet engine and positioned external to the flow path such that rocket exhaust from the rocket thruster travels along an exterior wall of the jet engine and begins to interact with the jet exhaust aft of the nozzle and external to the RBCC propulsion unit; and
- a plurality of rocket thrusters integrated with the jet engine and positioned external to the flow path, the plurality of rocket thrusters surrounding the nozzle.

5. A rocket based combined cycle (RBCC) propulsion unit, comprising:
- a jet engine having a flow path and a nozzle, wherein jet exhaust from the flow path exits the RBCC propulsion unit from the nozzle; and
- a rocket thruster integrated with the jet engine and positioned external to the flow path such that rocket exhaust from the rocket thruster travels along an exterior wall of the jet engine and begins to interact with the jet exhaust aft of the nozzle and external to the RBCC propulsion unit;
- a plurality of rocket thrusters integrated with the jet engine and positioned external to the flow path; and
- an electronic controller configured to control the plurality of rocket thrusters differently such that at least one thruster provides an amount of thrust different than at least one other thruster thereby steering the RBCC propulsion unit in a desired direction.

6. A rocket based combined cycle (RBCC) propulsion unit, comprising:
- a jet engine having a flow path defining a combustion chamber and a nozzle positioned such that exhaust from the combustion chamber flows into the nozzle; and
- a rocket thruster positioned external to the flow path such that exhaust from the rocket thruster travels along an exterior surface of the nozzle and interacts with the exhaust from the combustion chamber only aft of the nozzle and external to the RBCC propulsion unit, wherein the nozzle is shaped such that it converges and diverges for the flow path of the jet engine and forms a plug nozzle for the exhaust from the rocket thruster.

7. The RBCC propulsion unit of claim 6, wherein the RBCC propulsion unit comprises a plurality of rocket thrusters positioned external to the flow path such that the exhaust from the combustion chamber interacts with exhaust from the plurality of rocket thrusters only aft of the nozzle and external to the RBCC propulsion unit, the plurality of rocket thrusters surrounding the nozzle.

8. The RBCC propulsion unit of claim 6, wherein the RBCC propulsion unit comprises a plurality of rocket thrusters positioned external to the flow path such that the exhaust from the combustion chamber interacts with exhaust from the plurality of rocket thrusters only aft of the nozzle, and wherein the RBCC propulsion unit further comprises an electronic controller configured to control the plurality of rocket thrusters differently such that at least one thruster provides an amount of thrust different than at least one other thruster thereby steering the RBCC propulsion unit in a desired direction.

9. The RBCC propulsion unit of claim 6, wherein the rocket thruster is nested into an exterior wall of the jet engine.

10. The RBCC propulsion unit of claim 9, wherein the rocket thruster has a nozzle through which the exhaust from the rocket thruster exits, the nozzle of the rocket thruster positioned along the exterior wall such that the nozzle of the jet engine is aft of the nozzle of the rocket thruster.

11. The RBCC propulsion unit of claim 10, wherein the nozzle of the rocket thruster converges and diverges for the exhaust from the rocket thruster.

12. A rocket based combined cycle (RBCC) propulsion unit, comprising:
- a jet engine having a flow path and a nozzle, wherein jet exhaust from the flow path exits the RBCC propulsion unit from the nozzle; and
- a rocket thruster integrated with the jet engine and positioned external to the flow path such that rocket exhaust from the rocket thruster travels along an exterior wall of the let engine and begins to interact with the jet exhaust aft of the nozzle and external to the RBCC propulsion unit, wherein the rocket thruster is nested into the exterior wall of the jet engine.

13. The RBCC propulsion unit of claim 12, wherein the rocket thruster has a nozzle through which the exhaust from the rocket thruster exits, the nozzle of the rocket thruster positioned along the exterior wall such that the nozzle of the jet engine is aft of the nozzle of the rocket thruster.

14. The RBCC propulsion unit of claim 13, wherein the nozzle of the jet engine is shaped such that it converges and diverges for the flow path of the jet engine and forms a plug nozzle for the exhaust from the rocket thruster.

15. The RBCC propulsion unit of claim 14, wherein the nozzle of the rocket thruster converges and diverges for the exhaust from the rocket thruster.

16. A rocket based combined cycle (RBCC) propulsion method, comprising:
- receiving air into a jet engine via an intake of the jet engine;
- injecting fuel into the air in a flow path of the jet engine;
- burning the injected fuel within the flow path thereby creating jet exhaust;
- passing the jet exhaust through a nozzle of the jet engine and out of the jet engine;
- burning fuel via a rocket thruster integrated with the jet engine and positioned external to the flow path thereby creating rocket exhaust; and
- directing the rocket exhaust from the rocket thruster such that the rocket exhaust travels along an outer surface of the nozzle and begins interacting with the jet exhaust aft of the nozzle and external to the jet engine.

17. The method of claim 16, wherein an interior wall of the nozzle converges and diverges for the flow path, and wherein a contour of the outer surface forms a plug nozzle for the rocket thruster.

18. The method of claim 16, wherein the rocket thruster is nested into an outer surface of the jet engine.

* * * * *